July 6, 1965 W. W. DAVIS ETAL 3,193,692

MAGNETIC THIN FILM AMPLIFIER

Filed April 6, 1960

INVENTORS
WILLIAM W. DAVIS
WILLIAM M. OVERN
ARTHUR V. POHM
BY Carlson & Hazle
ATTORNEYS United States Patent Office 3,193,692

Patented July 6, 1965

3,193,692

MAGNETIC THIN FILM AMPLIFIER

William W. Davis and William M. Overn, Minneapolis, Minn., and Arthur V. Pohm, Ames, Iowa, assignors to Sperry Rand Corporation, New York, N.Y., a corporation of Delaware Filed Apr. 6, 1960, Ser. No. 20,397
10 Claims. (Cl. 307—88)

This invention relates to magnetic amplifiers constructed with ultrathin ferromagnetic elements exhibiting uniaxial anistropy and having a single magnetic domain under certain magnetic conditions.

The present invention provides an electrical signal amplifier especially adapted for use in logical switching systems, such as in digital computers. This invention minimizes undesired signal feedthrough between output and input by controlling the direction of magnetization rotation both during signal input and signal output phases of the amplifier operation.

Accordingly it is an object of the present invention to provide a two element magnetic amplifier each element having signal controlled magnetization rotation.

It is a further object to provide a magnetic amplifier which is easily adaptable to logical switching circuits requiring no undesired signal feedthrough.

It is another object of the present invention to provide a magnetic amplifier with noise signal cancellation by controlling the direction of rotational magnetization reversal.

These and other more detailed and specific objects will be disclosed in the course of the following specification, reference being had to the accompanying drawing, in which.

Figures 1, 2:
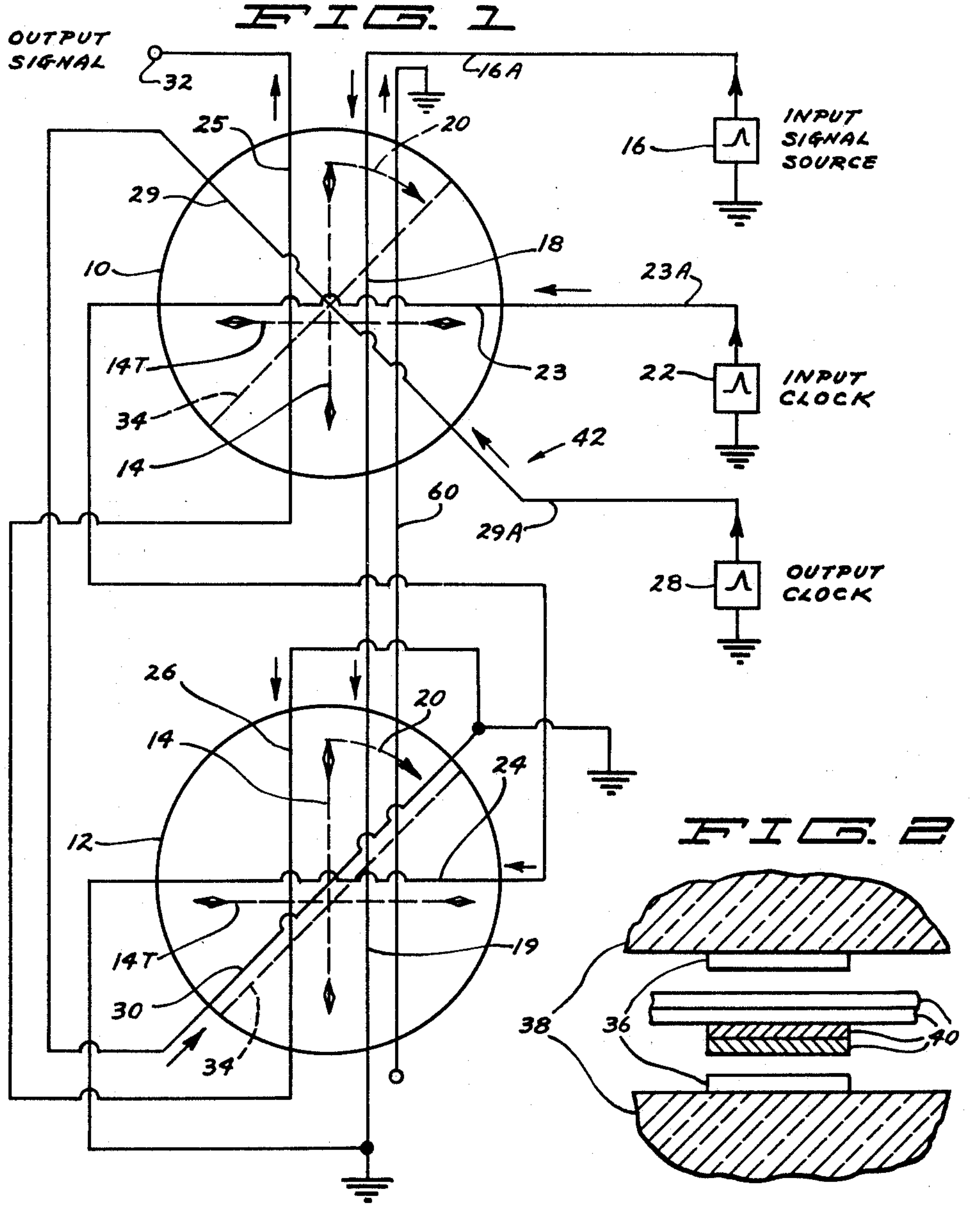
FIG. 1 is a diagrammatic illustration of a thin-film magnetic amplifier embodying the present invention.
FIG. 2 is a diagrammatic sectional view of an exemplary single two-film element together with the diagrammatically illustrated printed circuits linking same.

Referring now to the accompanying drawing there is shown the magnetically independent thin-film ferromagnetic disc shaped elements 10 and 12. These elements are preferably formed by the method and apparatus disclosed in the Rubens Patent 2,900,282, issued on August 18, 1959. Such film elements have uniaxial anisotropy, that is a single preferred or easy axis of magnetization and a single difficult or hard axis of magnetization exist in the plane of the film. The films can be magnetized such that all of the elements' residual magnetization or remanence is in one direction along the easy axis. Applying a magnetic field along the hard direction rotates the remanence as a single magnetic domain. When the hard axis field exceeds a predetermined field strength the magnetic behavior is changed from single to poly-domain. Each film's single domain behavior is limited by its physical makeup.

Magnetization rotational reversal is provided by applying an external magnetic field along the hard axis concurrently with a second applied field aligned with the easy axis. It is to be understood that once the elements each have single domain remanence it is preferred that it be preserved. Also a single magnetic field having both easy and hard axis field components can cause rotational switching or magnetization reversal. The mechanism of pure rotational switching is described by C. D. Olson and A. V. Pohm in "Flux-Reversal in Thin Films of 82% Ni, 18% Fe" on page 274 and by R. M. Sanders and T. D. Rossing in "Reversible Rotation in Magnetic Films" on page 288, Journal of Applied Physics, vol. 29, No. 3, March 1958.

In the illustrated embodiment, in which no logical decision features are included, there are required four windings on each element in the amplifier. An input signal source 16 provides a current impulse through the series connected input windings 18 and 19. The resultant input magnetic fields in the elements 10 and 12 are linked to the respective hard axes urging the residual magnetizations aligned with the easy axis to rotate in the direction of the arrows 20. Note rotation is in like directions in both elements.

Concurrently with the input signal current the input clock power-pulse 22 provides a current impulse through the series input clock windings 23 and 24. The resultant magnetic fields in the respective elements link the easy magnetization axis to complete the magnetization reversal by rotating the partially rotated magnetization to the opposing direction along the easy axis. Note the magnetization rotation is in the same relative direction or sense in both elements, i.e., clockwise. It is immaterial which direction along the easy axis the residual magnetization is initially directed, the important feature being that the magnetization reverses in like directions of rotation in both magnetic elements during the just described input phase.

The series signal output windings 25 and 26 respectively magnetically link the hard axes 14T of each element and are opposingly disposed on the elements such that the input signal in windings 18 and 19 provides opposing voltages therein. As the magnetization of each element is rotated in like relative directions the resulting voltages in the output windings are equal and 180° out of phase providing complete cancellation thereof. It is to be noted here that in windings linking the hard direction of magnetization one complete alternating voltage cycle is induced therein for each magnetization reversal, the phase of the induced voltage being determined solely by the rotational direction.

The output signal is provided by rotationally reversing the elements' respective magnetizations in oppositely rotating directions. An output-clock power-pulse source 28 provides a switching current impulse through the diagonal series connected opposingly-disposed windings 29 and 30. Each winding provides a magnetic field in the respective elements at an angle to the easy axis 14 therefore having both easy and hard axis magnetic field components. The element 10 magnetization returns to its initial magnetic direction by rotating in the direction of the arrow 20 while the element 12 magnetization is reversed by rotation in the opposing direction, i.e., counterclockwise. The resulting voltages in the output windings 25 and 26 are in-phase to provide a signal-voltage-to-ground reference potential on the terminal 32. The resulting induced voltages in the input signal windings 18 and 19 are 180° out-of-phase for substantial cancellation.

The source 16 may provide no current to the input windings for preventing the described magnetization reversals with the output-clock impulse "rise" and "fall" possibly causing insubstantial and momentary voltages in the output windings. Further, if the sources 16 and 22 are combined to provide a controlled input pulse through windings (not shown), disposed along the lines 34, the described magnetization reversals are obtained. In any event, the described controlled magnetization rotational reversals prevent signal feedthrough from the input to the output during the input phase and the reverse during the output phase.

As shown in FIG. 2, in embodying the present invention it is preferred that each magnetic element 10 and 12 consist of two-spaced-apart thin ferromagnetic films 36 each on a suitable substrate 38. Interposed between the films 36 are the windings generally indicated by the number 40 such that each winding has a width equal to the film diameter and arranged as shown in FIG. 1. With this arrangement each film acts as a highly permeable shunt for the other. The easy and hard axes of magnetization of the films 36 are respectively aligned.

This amplifier is primarily useful in binary or logical switching systems wherein a binary "1" or a logical "yes" is indicated by the presence of a predetermined current amplitude at a specific time, while a "0" or a "no" is indicated by the absence of such a current amplitude or signal at said time. Accordingly, to amplify a binary "1" signal the described magnetization reversal processes are performed, whereas there is no such activity when a binary "0" signal is "transferred" through the amplifier.

Figure 3:
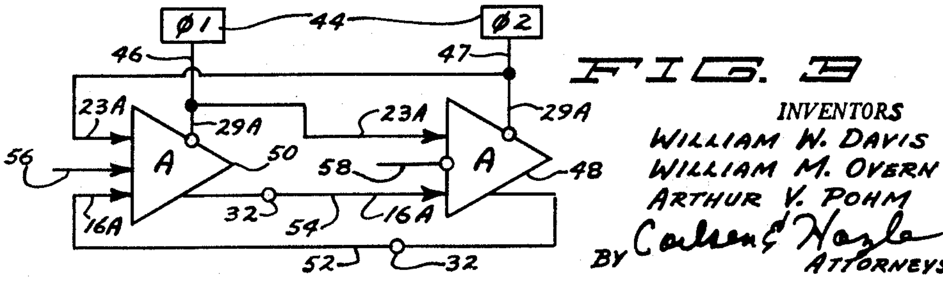
FIG. 3 is a block diagram of two magnetic amplifiers of the present invention interconnected with a two-phase power pulse source to form a bistable memory element.

The just described amplifier may be connected to another amplifier, as shown in FIG. 3, to form a one binary digit (bit) storage element. The signal output terminal 32 of each amplifier 42, as shown in FIG. 1, is connected to the signal input 16A of the other amplifier. This corresponds to the windings 18 and 19 of FIG. 1 for both amplifiers. Two power pulse sources 44 provide rectangular waves 180° out-of-phase respectively on the lines 46 and 47. The line 46 is connected to input 23A, corresponding to the clock windings 23 and 24, of amplifier 48 and to the output clock connection 29A, corresponding to the FIG. 1 windings 29 and 30, of the other amplifier 50. The line 47 is similarly connected to 23A of amplifier 50 and to 29A of amplifier 48. The $\phi 1$ source 44 transfers the stored "signal" from amplifier 50 to 48 during one time period while the $\phi 2$ source 44 reverses the transfer during a different time period causing a "signal" to recirculate and thus be stored.

The two amplifiers have their signal windings interconnected by the lines 52 and 54. Each line connects the output windings 25 and 26 of one amplifier to the input windings 18 and 19 of the other amplifier. Each series connection providing windings linking three magnetic elements in like direction and linking a fourth magnetic element, one in each of the two amplifiers 48 and 50 respectively for the lines 52 and 54, in an opposing direction to prevent the respective amplifier output "signals" from appearing at their respective inputs as aforedescribed with reference to FIG. 1.

To insert a "1" or "yes" indicating signal into the FIG. 3 device a second set of input windings is provided in amplifier 50 as indicated by the arrow 56 and is disposed parallel to the FIG. 1 windings 18 and 19. A current impulse occurring during a $\phi 2$ power pulse rotates the amplifier 50 elements magnetization as described for elements 10 and 12.

To "erase" a "1" signal or insert a "0" signal, a current impulse is provided through an opposing signal input winding in the amplifier 48 as indicated by the circle ended line 58. Referring again to FIG. 1 it may be assumed the windings 18 and 19 are connected to the FIG. 3 line 54 for signal recirculation. A second set of signal input windings 60 parallel to the windings 18 and 19 is for carrying a current impulse for cancelling the recirculated signal provided M.M.F. Note that if a "1" signal is not being recirculated a current impulse will insert a "1" signal.

This latter arrangement provides what is termed an "exclusive or" circuit in that a signal on either the input signal windings 18–19 or 60 provides a "1" signal, whereas no signal current or a signal current in both opposing input windings does not result in a "1" signal at the output terminal 32. Note that the output phase magnetization rotation directions are the same irrespective of the input rotation directions, resulting in a like poled output signal regardless of which winding set 18–19 or 60 provides the input. In this manner logical decisions may be mechanized by using the present invention.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A magnetic amplifier comprising two independent ferromagnetic elements each having single domain remanence and an easy and a hard magnetization axis, input winding means magnetically associated with each element along both the easy and hard magnetization axes respectively in first relative directions with respect to said elements axes for causing magnetization reversal in first rotational senses, output winding means magnetically associated with the elements hard axes respectively in said first direction in one element and opposite to said first direction in the other for respectively sensing magnetization reversals in rotational senses opposite to the first sense, and initial magnetization returning winding means magnetically associated with each element's easy magnetization axis in a second relative direction and with the hard axis in like relative directions to the output winding means for causing magnetization reversal in the elements by rotation respectively in said opposite senses.

2. A magnetic amplifier comprising two independent ferromagnetic elements each having single domain remanence and easy and hard axes of magnetization, signal input winding means magnetically associated with each element's hard magnetization axis respectively in a first of two relative directions to each axis, input clock winding means magnetically associated with each element's easy magnetization axis for reversing the magnetization of each element in coincidence with a signal in the signal input winding means, output winding means magnetically associated with each element's hard magnetization axis respectively in the first and opposite to said first relative directions, and output clock winding means being magnetically associated with both element's easy axes for reversing the respective magnetizations and with the hard axes in the same directions as said output winding means for transferring in-phase fluxes to the output windings during re-reversal of the respective magnetizations.

3. A magnetic amplifier comprising two ferromagnetic elements each of which has magnetic remanance along a single easy magnetization axis with a transverse hard magnetization axis, input winding means magnetically associated with each element in first directions along both the respective magnetization axes for respectively rotationally reversing the easy axes magnetic remanence in first relative rotational directions with respect to the easy axes, and output winding means magnetically associated with both magnetization axes of each element respectively in said first and in a second direction for re-reversing the input-means-reversed remanence of each element respectively in first and second relative rotational directions with respect to the easy axes whereby any voltages induced in one of said winding means by a change in magnetization along said hard axes caused by the other winding means substantially cancel each other.

4. A magnetic amplifier comprising two ferromagnetic elements each having an initial residual magnetization along their respective easy magnetization axes and each having a hard magnetization axis, series connected signal input windings magnetically associated respectively with the hard axis of each element, series connected input clock windings respectively magnetically associated with the easy axis of each element, series connected signal output windings respectively magnetically associated with the hard axes of the elements with one of the windings on the one element being opposingly disposed to the signal input winding on that element and the other signal windings on the other element being like disposed thereon, and series connected output clock windings magnetically associated with both axes of the respective elements in like directions to said signal output windings and opposing to said input clock windings.

5. In a magnetic amplifier, two ferromagnetic elements each of which have single domain remanence and with easy and hard magnetization axes, each element being initially magnetized in a first of two directions along their respective easy axes, the remanence of each element being reversible by a rotational process in either of two rotational directions or senses, signal input means magnetically associated with both elements along their respective hard axes for biasing their respective magnetic remanences in a first rotational direction from said easy axes, input clock means magnetically associated with each element along the respective easy axes for reversing the remanence by continued rotation only when the signal input means has so biased same, signal output winding means respectively magnetically associated with the elements along the hard axes and being disposed on one element in opposing relation to the signal input means and like disposed thereto on the other element, output clock means magnetically associated with both elements for returning the reversed remanances to said first direction by rotation in each element of opposing rotational directions.

6. In a magnetic amplifier, two ferromagnetic elements each having initial residual magnetization in first directions along their respective easy magnetization axes, each element being subject to magnetization reversal by magnetization rotation, input means including a winding and being magnetically associated with each element for reversing the respective residual magnetizations by rotation in respective first directions, output means including a winding and being magnetically associated with each element for returning the reversed magnetization to the first directions by magnetization rotation in one element in its first rotational direction and in the other element in a second direction, and the output means including direction of rotation sensing means for providing an output signal as the two elements have their respective magnetizations simultaneously reversed in their respective first and second rotational directions.

7. A bistable device comprising two interconnected magnetic amplifiers each consisting of two ferromagnetic elements each of which has one hard and one easy magnetization axis with an initial residual magnetization in a first direction along their respective easy axes, two hard axes winding means each interconnecting the two amplifiers, a first one of the winding means being magnetically associated with one element in one amplifier in a direction opposing the other winding means and in aiding direction in the other element the other winding means being magnetically associated with one element in the other amplifier in a direction opposing the first winding means and in aiding direction in the other element two rotational magnetization reversing means each being magnetically associated with both amplifier elements respectively in like manner as the two winding means along the hard axes, the reversing means opposing each other along each easy magnetization axis, and each reversing means being operative to reverse the magnetizations at different times.

8. A logical decision device comprising a pair of ferromagnetic elements each with easy and hard magnetization axes and having residual magnetization along the easy axis in one of two directions, the residual magnetization of each element being subject to reversal by rotation in either of two directions, output means magnetically associated with both elements for reversing their respective residual magnetization to a first direction by rotation in first relative rotational directions or senses with respect to each other, the output means including sensing winding means magnetically associated with each element hard magnetization axis for inducing in-phase electrical current components during magnetization rotation in said first relative directions, input winding means magnetically associated with said elements for reversing the residual magnetization from said first direction by rotation in other than said first rotational directions or senses, and the input winding means including at least two separate inductively coupled windings magnetically associated with the hard magnetization axes for rotating the magnetizations only when a predetermined set of current amplitudes appear in said separate windings which are indicative of a predetermined logical relation.

9. A device as in the claim 8 wherein the input winding means comprise two opposing sets of windings to provide an exclusive OR input circuit.

10. Apparatus as in the claim 8 wherein the residual magnetization of each element constitutes a single magnetic domain.

References Cited by the Examiner

UNITED STATES PATENTS

| | | | |
|---|---|---|---|
| 2,941,096 | 6/60 | Lo | 307—88 |
| 3,023,402 | 2/62 | Bittman | 340—174 |
| 3,030,162 | 4/62 | Rubens | 340—174 |

OTHER REFERENCES

Pages 55–57, June 5, 1959—"Using Thin Films," Eric E. Bittman, Electronics.

IRVING L. SRAGOW, *Primary Examiner.*

EVERETT R. REYNOLDS, *Examiner.*